US005742000A

United States Patent [19]
Stevens

[11] Patent Number: 5,742,000
[45] Date of Patent: Apr. 21, 1998

[54] DEVICE AND METHOD FOR PREVENTING ARCING AND RESULTANT FLASHING DURING REPAIRS PERFORMED INSIDE PAD-MOUNTED TRANSFORMERS

[75] Inventor: Sammie D. Stevens, Raleigh, N.C.

[73] Assignee: Carolina Power & Light Company, Raleigh, N.C.

[21] Appl. No.: 146,915

[22] Filed: Nov. 3, 1993

[51] Int. Cl.$^6$ .................................................. H02G 1/02
[52] U.S. Cl. .................................. 174/5 R; 174/138 F
[58] Field of Search ......................... 174/1, 5 R, 55 B, 174/137 R, 138 E, 138 F, 138 G, 138 R; 336/206; 361/617, 620, 623, 823; 439/110, 113, 119, 135; 200/304, 305

[56] References Cited

U.S. PATENT DOCUMENTS

| | | | |
|---|---|---|---|
| 881,682 | 3/1908 | Harrison et al. | 174/5 R |
| 1,728,545 | 9/1929 | Haushalter | 174/5 R X |
| 1,999,894 | 4/1935 | Coan | 174/5 R |
| 2,263,319 | 11/1941 | Treanor | 174/139 |
| 2,727,966 | 12/1955 | Reichert et al. | 200/304 |
| 3,042,736 | 7/1962 | Salisbury | 174/138 F X |
| 3,133,984 | 5/1964 | Farough et al. | 174/138 F X |
| 3,211,820 | 10/1965 | Hoffman | 174/5 R |
| 3,457,360 | 7/1969 | D'Entremont | 174/138 F |
| 3,510,568 | 5/1970 | Cochran | 174/5 R |
| 3,626,151 | 12/1971 | Them et al. | 174/5 R X |
| 3,755,637 | 8/1973 | Gloviak et al. | 174/152 R X |
| 3,914,660 | 10/1975 | Stearley | 174/5 R X |
| 4,707,562 | 11/1987 | Whited | 174/5 R |

OTHER PUBLICATIONS

Michael G. McGraw, "Joint effort yields new barrier design", Jan. 1985, Electrical World, pp. 85–86.

*Primary Examiner*—Hyung S. Sough
*Attorney, Agent, or Firm*—Richard S. Faust

[57] ABSTRACT

The risk of personal injury to personnel working inside energized pad-mounted transformers is reduced by providing a universally sized safety shield device that fits in place during repair operations to prevent a workman's tool from contacting the transformer face. The shield device takes the form of a rigid sheet of dielectric material having sufficient insulative value to prevent arcing inside the transformer. The shield has three slots opening to an edge of the shield with the three slots being so sized and shaped to permit them to slide over the secondary bushings to locate and hold the safety shield in place during repair operations. The shield is used in association with a pair of novel insulative bushing covers.

13 Claims, 7 Drawing Sheets

DEVICE AND METHOD FOR PREVENTING ARCING AND RESULTANT FLASHING DURING REPAIRS PERFORMED INSIDE PAD-MOUNTED TRANSFORMERS

FIELD OF THE INVENTION

The invention relates to the transmission of electrical power through pad-mounted transformers. More particularly, the invention relates to devices and associated operating procedures for assuring the safety of working personnel when performing repairs inside energized pad-mounted transformers by reducing the risk of accidental arcing and resultant flash-related injuries to personnel and damage to equipment.

BACKGROUND OF THE INVENTION

The inside of a residential pad-mounted transformer includes one side where the transformer windings are encased in oil and a second "access side" where the line connections are made for running the wires from the transformer to the several (e.g., 3 to 8) houses being served by the transformer. The transformer side and the access side are separated by a "transformer face" that extends vertically. When a lineman opens a transformer for access, he typically sees three secondary bushings at 120V/240V and two primary bushings at a voltage in the range of 7,000V to 15,000v, usually about 13,000V. Each of the secondary bushings supports a standard connector bar at which the wires are connected for running to the houses.

When it becomes necessary to service the transformer (for example, to remove and replace a wire connected to one of the connector bars) it is important that proper safety precautions are used. First, the lineman should wear rubber gloves. Second, the lineman should apply insulative "bushing covers" over the two bushing connector bars that are not being accessed. At this point, according to prior art practices, the worker is ready to apply a pair of socket wrenches to the nuts on one of the connector bar bolts to loosen the same for replacement of a wire. The worker has to be very careful not to allow one of the wrenches to contact the transformer face. When a wrench contacts the transformer face, a "flash" situation results. A flash produces a bright light that can damage the worker's eyes, can damage the tools in use, can damage the bushing and can otherwise damage the transformer to the point where it may have to be removed from use. A flash is to be avoided at all costs.

One prior art practice is to provide the handles of wrenches used to loosen/tighten the connections at the connector bars with electrically insulated coverings so that when the handle accidentally strikes the transformer face, there is no flash. However, the insulated coating tends to wear away because the contact is always made at the same spot, resulting in less than adequate protection for the lineman. In fact, this approach can be counterproductive because the line worker places undue reliance on the insulated cover and may become careless.

Thus, there is a need for safety devices and associated operating procedures to enable linemen to work inside energized pad-mounted transformers with a substantially reduced risk of creating a flash situation.

SUMMARY OF THE INVENTION

The present invention addresses the above concern for worker safety by providing a specially tailored flash-preventing safety shield that can be readily inserted in place prior to work at the access side of an energized pad-mounted transformer. The safety shield takes the form of a rigid sheet of electrically insulated material including a slot structure that slides over the secondary bushings and associated connector bars. The slot structure serves to locate the shield in an orientation that protects against flashes and also serves to retain the shield in place, preferably including a friction fit in some areas. In one preferred embodiment, the shield may take a generally rectangular shape with three slots opening to one edge of the shield and with the remaining portion of the shield being of sufficient size to cover the adjacent portions of the transformer face at which a flash is most likely to occur. The shield also may include a raised corner portion that provides added protection so that the lineman's tools cannot contact the breaker operating handle that protrudes from the transformer face of most currently manufactured pad-mounted transformers. In one embodiment, the shield is formed from a PVC acrylic alloy having a thickness sufficient to provide adequate insulative protection for the voltage levels encountered in pad-mounted transformers. One additional feature of the invention is the provision of novel, compact bushing covers that are designed for ease of installation and removal and also increase the lineman's accessible work zone around the connector bar at which the repair is being made. Thus, the invention also may be defined as a kit including a safety shield and a pair of bushing covers for covering the two connector bars that are not being accessed in a repair operation.

In another aspect, the invention is defined as an operational procedure for assuring the safety of working personnel performing repairs inside energized pad-mounted transformers.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
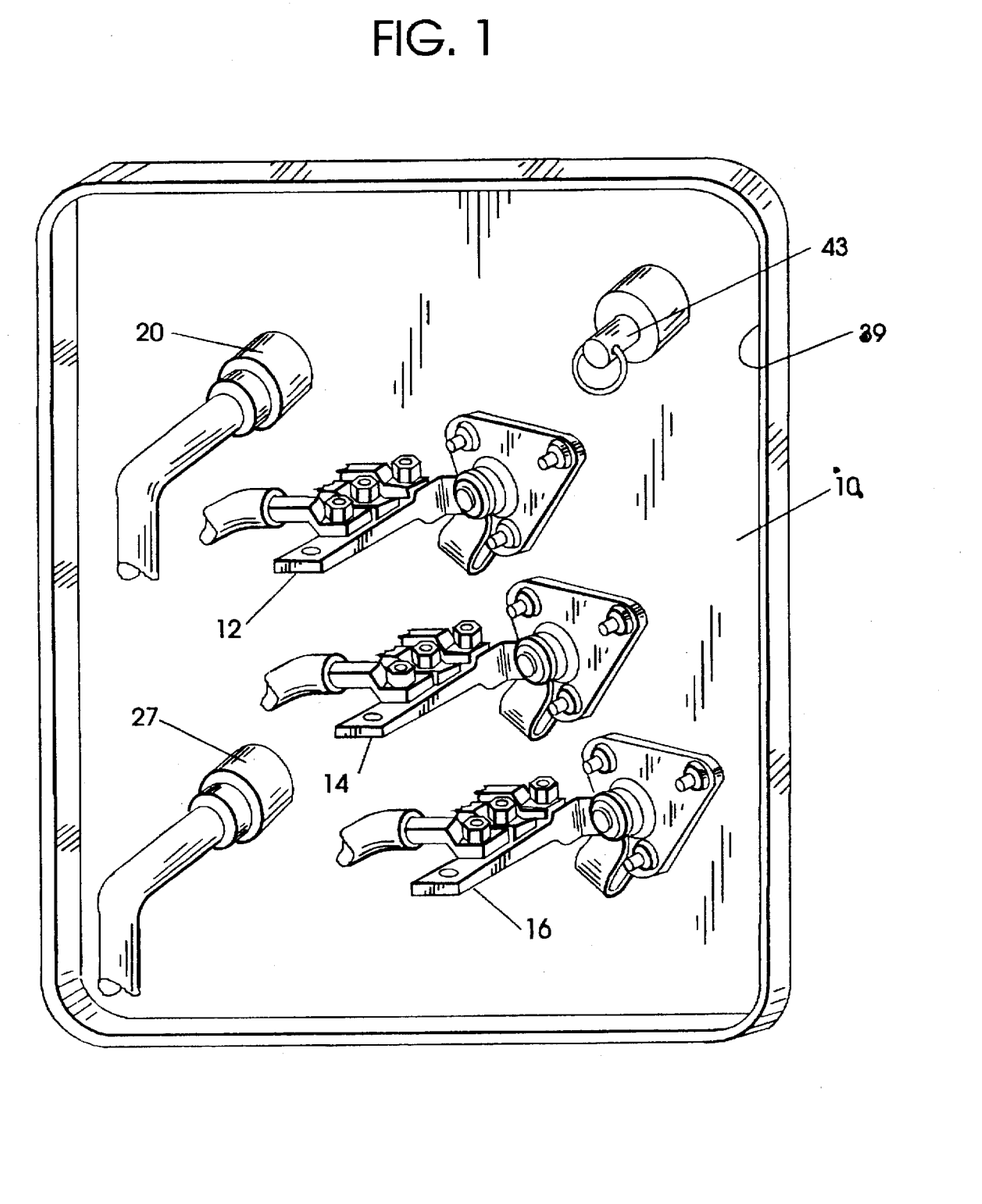
FIG. 1 is a pictorial view of a portion of the inside of a conventional pad-mounted transformer showing the access side which includes the primary and secondary bushings and the transformer face.

Referring to the drawings, FIG. 1 illustrates the access side of a conventional residential pad-mounted transformer of the type described above in the "Background" portion of this specification. The pad-mounted transformer also includes a windings side, not shown, that houses the transformer windings which are encased in oil in the manner well known in the art.

The windings side and the access side are separated by a "transformer face" that extends vertically. When a lineman opens a transformer for access, he sees what is shown in FIG. 1. The transformer face 10 supports three secondary bushings and associated connector bars 12, 14, 16 and two primary bushings 20, 27. The two primary bushings 20, 27 are at 7,000V to 15,000V (typically about 13,000V) which is reduced to 120V/240V at the three secondary bushings.

Each of the secondary bushings shown in FIG. 1 attaches to a respective standard spade connector bar at which the wires are connected for running to the houses. Each connector bar includes four openings for receiving connecting bolts so that multiple houses, typically up to eight houses, can be served from the transformer—with two wires leading from each bolt with one on top of the connector bar and one on the bottom. An example of a pad-mounted transformer for which the present invention is useful is manufactured by Howard Industries of Laurel, Miss., U.S.A. as a class OA, 60 Hertz, continuous 60° C. rise, single phase transformer having a high voltage side at 13,200V and a low voltage side at 120V/240V.

Figure 2:
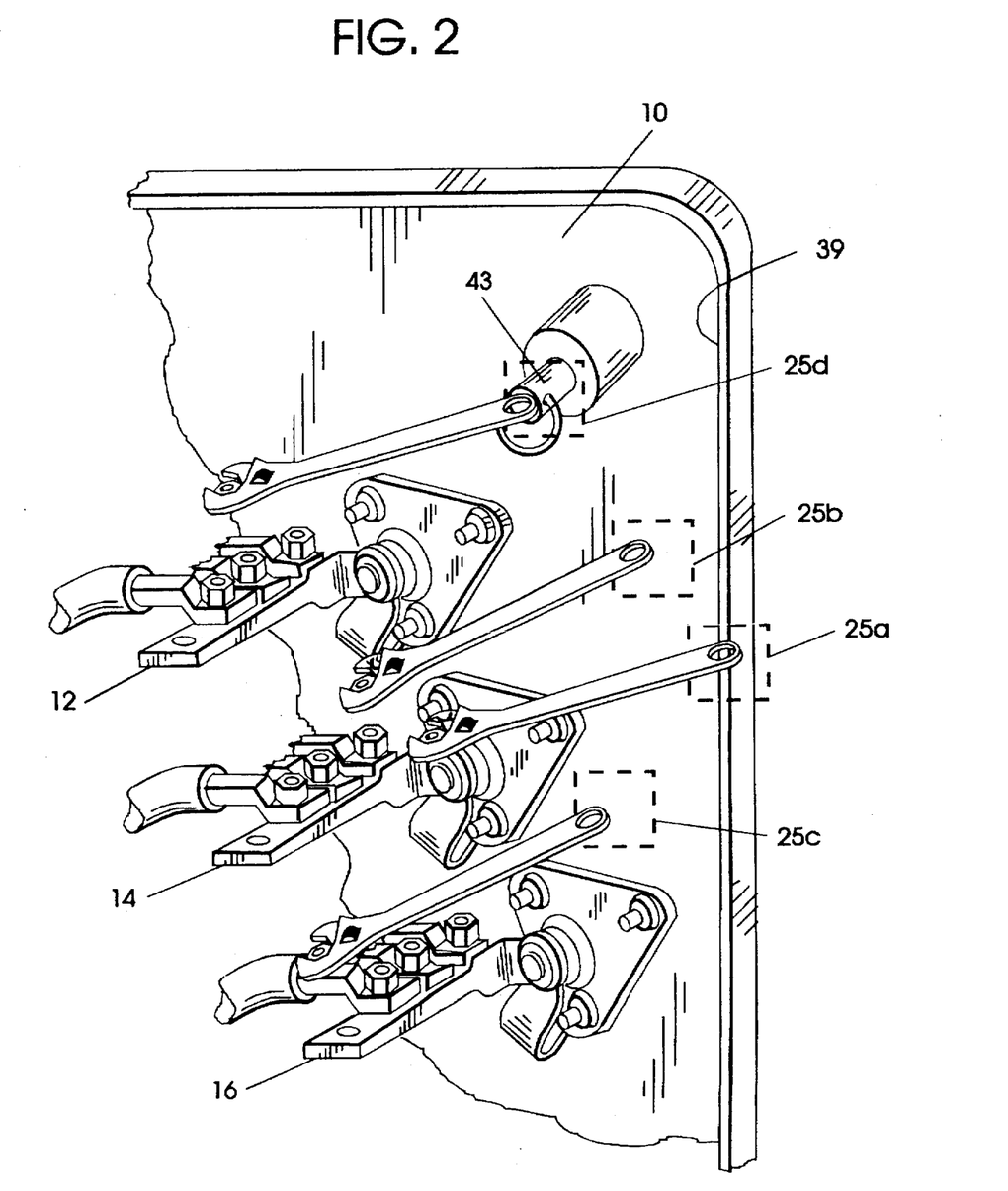
FIG. 2 is a pictorial view of the three secondary bushings and adjacent portions of the transformer face as shown in FIG. 1, with no safety shield in place and showing several wrenches and areas (in dashed lines) where the wrenches are likely to make contact to create flash situations.

FIG. 2 depicts several representative situations where a worker's wrench contacts a portion of the transformer face to create a "flash." In the area enclosed by dashed lines 25a, a wrench has contacted the vertical lip 39 on the transformer face. Dashed lines 25b and 25c illustrate wrench contact at two locations on the planar surface of the transformer face. Dashed lines 25d show the contact of a wrench with the raised breaker operating handle 43. These representative flash situations that may occur without use of the present invention will be discussed in more detail below.

Figure 3:
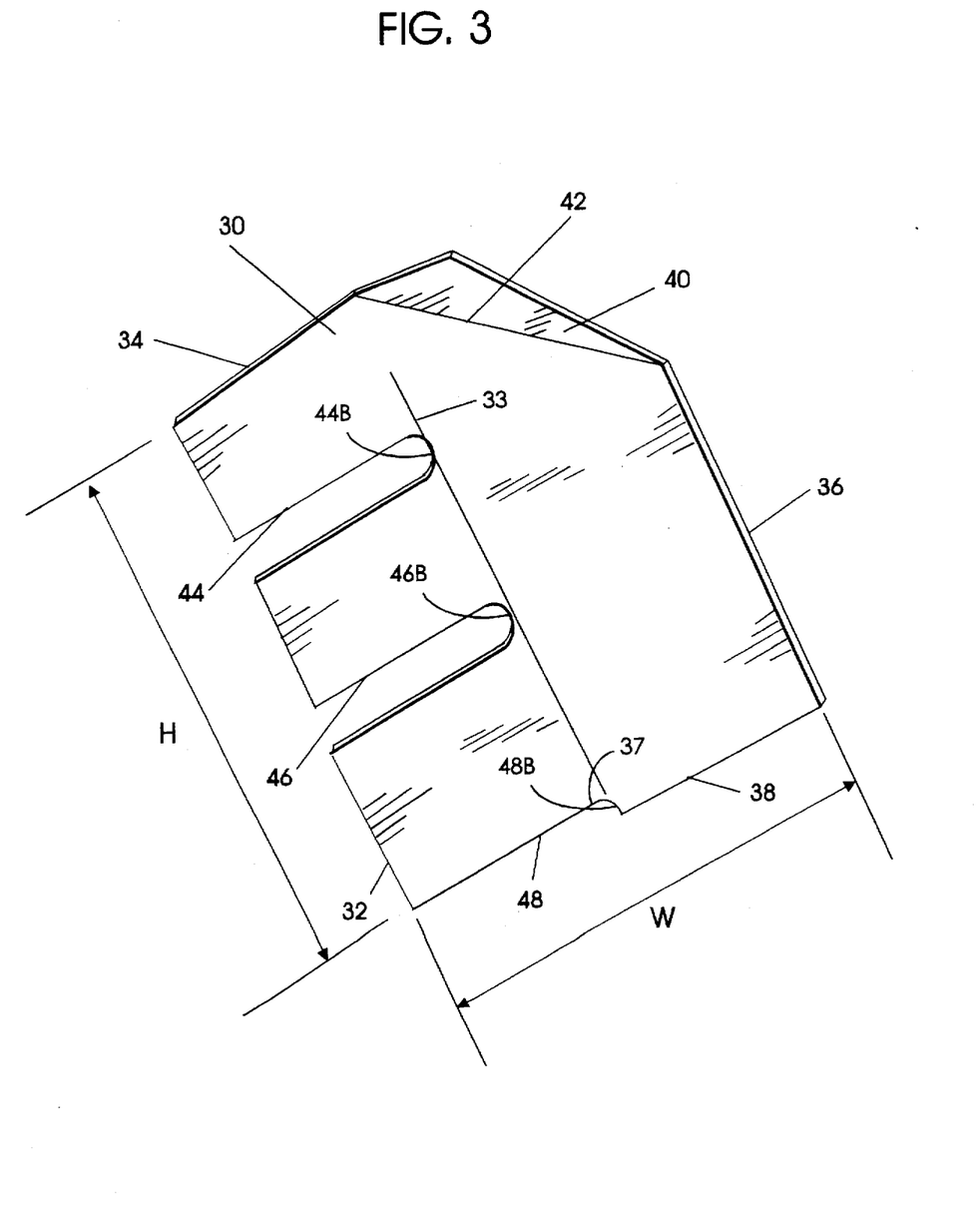
FIG. 3 is a front plan view of a safety shield constructed in accordance with the present invention.

FIG. 3 illustrates a safety shield 30 constructed in accordance with the present invention. Shield 30 is formed as a mostly planar, rigid sheet of dielectric material which has a thickness sufficient to provide the desired insulative value, in this instance protection to at least 240V. However, it will be appreciated that insulative values well in excess of 240V may be desired for purposes of providing a safety margin. Safety shield 30 includes four sides or edges 32, 34, 36, 38 and, in a preferred embodiment, a bent back corner portion 40. Three slots open to edge 32. Uppermost slot 44 and middle slot 46 are full slots. Lowermost slot 48 is a half slot. Slots 44, 46, 48 are spaced slots 44, 46, 48 open to edge 32. Slots 44, 46, 48 are spaced apart by distances corresponding to the spacing between the three secondary bushings mounted to the transformer face. In this regard, the spacing between the secondary bushings of residential pad-mounted transformers is substantially the same throughout the industry and it has been found that slots having a width on the order of 1$^{7}$⁄$_{16}$ inches and a length on the order of 7$^{5}$⁄$_{8}$ inches spaced apart by 5$^{5}$⁄$_{16}$ inches (center to center) will accommodate virtually all residential pad-mounted transformers currently in use. Edge 32 is approximately 16 inches in length (dimension H) and edge 38 is approximately 14 inches in length (dimension W) resulting in an overall area for safety shield 30 that is sufficient to cover the portions of the transformer face adjacent to the secondary bushings. Also, because tool contact with the transformer face often occurs at the somewhat protruding vertical lip 39, in preferred embodiments shield 30 has a size and shape permitting it to cover portions of vertical lip 39 where flashes are most likely to occur.

The raised corner portion 40 of shield 30 is an optional feature that provides operational advantages as described below. Raised corner portion 40 is integrally formed with the remainder of shield 30 and preferably is formed by simply bending back the corner of the shield material along a fold line 42 that is approximately 9 inches long so that the corner portion 40 is inclined to the remainder of the shield at an angle in the range of about 20° to about 90°, with an angle of about 70° being preferred. A first advantage of raised corner portion 40 is that it provides the lineman, who should be wearing cumbersome rubber gloves, with a raised "handle" to grip shield 30 during insertion of the shield to its operative position and subsequent removal of the shield. Additionally, raised corner portion 40 provides a raised shield protection against contact of the lineman's wrench with the breaker operating handle 43 that protrudes several inches from the transformer face at the upper right corner thereof as viewed in FIGS. 1, 2, 4, and 5. Breaker operating handle 43 is a feature of most current pad-mounted transformers and serves the well known function of providing the lineman with a means to de-energize the secondary side in those situations where the repair operation cannot be performed under "hot" conditions.

In particular embodiments, safety shield 30 is formed of a PVC acrylic alloy having a sufficient thickness to provide an insulative value that provides a large safety margin. In one particular embodiment, the PVC acrylic alloy is formed of Kydex material manufactured by Rohm & Haas, of Philadelphia, Pa., U.S.A. The Kydex material has a dielectric value of approximately 300. Thus, a particular safety shield formed of this material having an insulative value of 37,500 volts has a thickness on the order of ⅛ inch.

Figure 4:
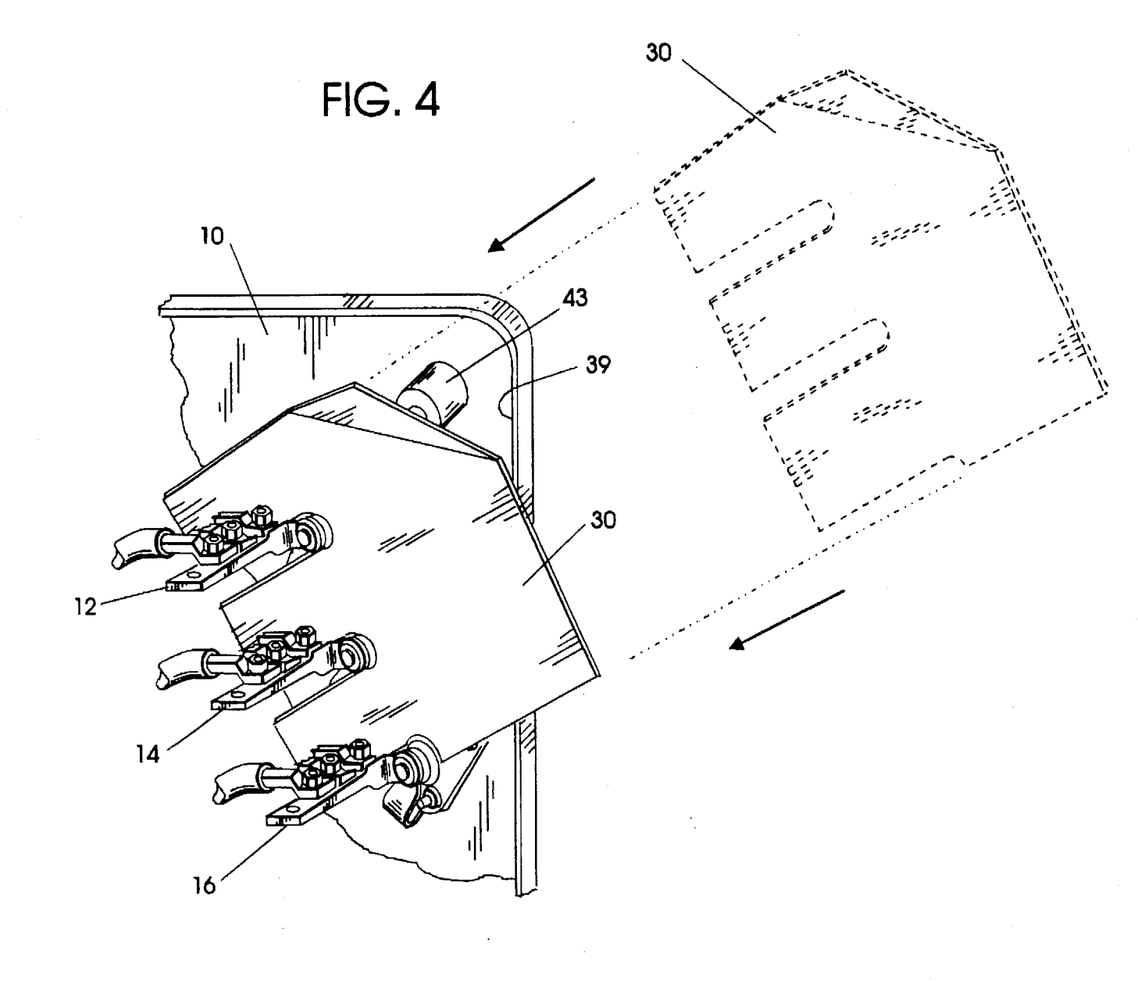
FIG. 4 is a view showing a safety shield, in dashed lines, in a ready position prior to installation and, in solid lines, after having been inserted into operative position at the three secondary bushings.

FIG. 4 shows safety shield 30 in exploded orientation (dashed lines) in the position it occupies prior to being placed in operative position. As discussed above, the three slots 44, 46, 48 are sized and oriented to readily slide over the three secondary bushings and behind the three connector bars 12, 14, 16 to the position that shield 30 occupies in its solid line position in FIG. 4. The respective base portions of the three slots define an aligned base structure. In this position, safety shield 30 overlies the portions of the transformer face adjacent to the secondary bushings and the area between the bushings and the vertical lip 39 of the transformer face, while also covering the portion of the vertical lip 39 that would be most susceptible to causing a flash situation.

Figure 5:
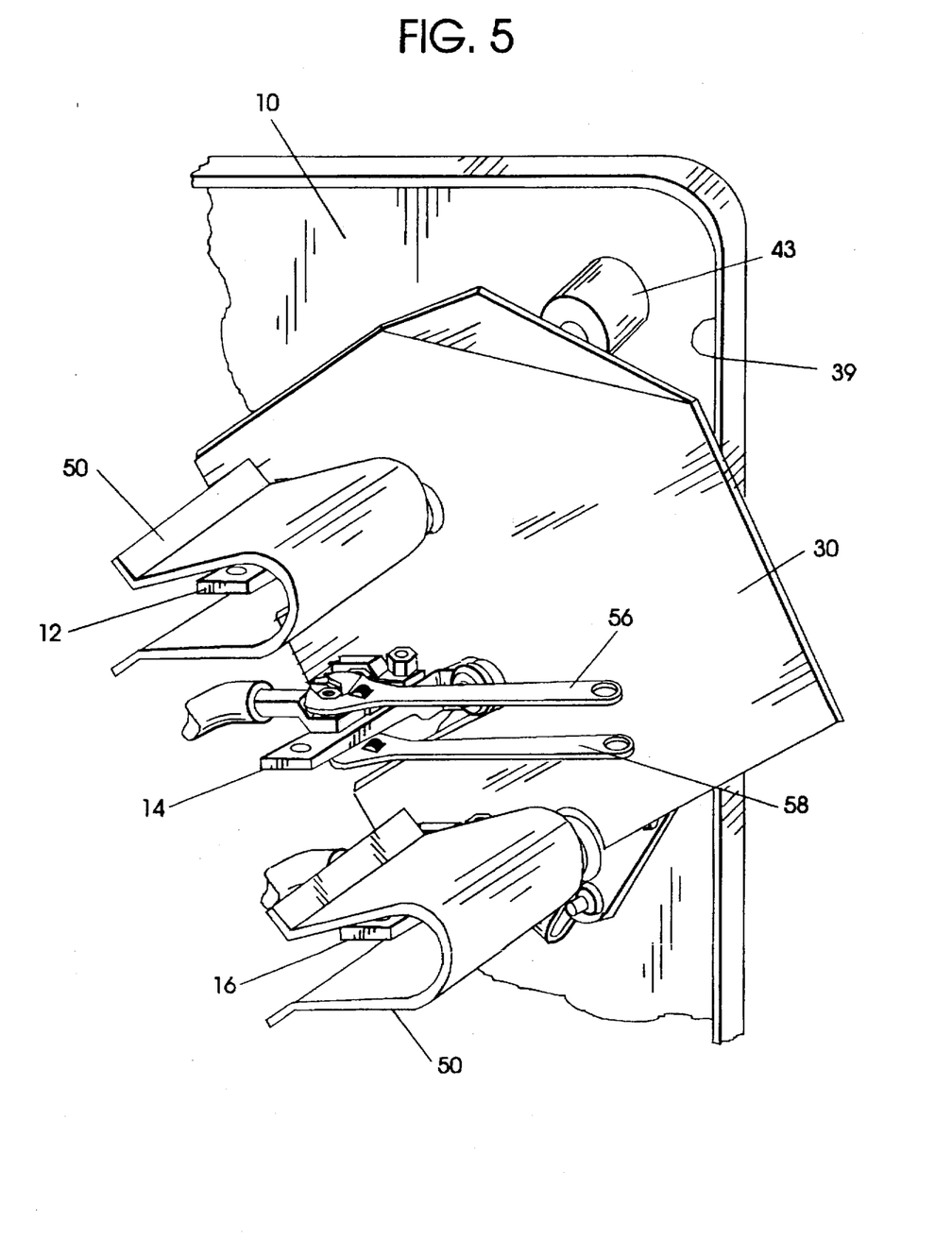
FIG. 5 is a view similar to FIG. 4 and additionally showing two bushing covers of the present invention in place over the two bushing connector bars upon which repairs are not being performed and showing a pair of wrenches in place on the bushing connector bar at which work is being performed.

FIG. 5 shows safety shield 30 in operative position and also shows a pair of bushing covers 50 which are placed over the two secondary bushing connector bars that are not being repaired, leaving the third connector bar available for access by a pair of wrenches 56, 58. As illustrated, wrenches 56 and 58 are shielded from contact with the two connector bars covered by the bushing covers and are also shielded from contact with the transformer face, including the vertical lip 39 of the transformer face, thereby effectively reducing or eliminating the chance of an inadvertent arcing and resultant flash. In this operational position, the raised corner portion 40 of shield 30 protects against the wrenches coming into contact with the above-mentioned breaker operating handle 43, especially in those cases where the lineman is performing a repair at the uppermost connector bar 12.

Figure 6:
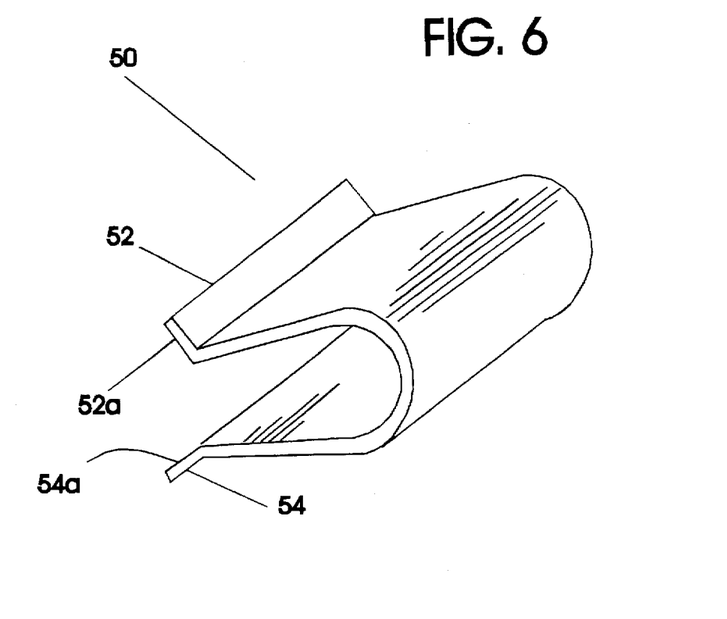
FIG. 6 is a pictorial view of a bushing cover of the present invention.

Referring to FIG. 6, there is shown a representative clip-type bushing cover 50 constructed in accordance with the principles of the present invention. Bushing cover 50 has a length, e.g., ten inches, sufficient to cover standard connector bars such as connector bars 12, 14, 16 and has a spring resilience that facilitates insertion of cover 50 over a connector bar and retention of the cover in place during repairs. Cover 50 includes a generally U-shaped cross section and a pair of integral ears or flaps 52, 54 that flare out at the base of the two depending legs of the cover. In operation, the lower surfaces 52a, 54a of the flaps are designed to contact the connector bar as the lineman pushes cover 50 into place, so that surfaces 52a, 54a serve as ramps or cam surfaces that spread apart the resilient cover to accommodate the connector bar. The resiliency and memory of the material forming cover 50 permits the cover to tightly overlie the connector bar during repair operations, resulting in a less bulky cover that is positively positioned. The reduced bulk and improved fit of cover 50 gives the lineman an increased work zone around the exposed connector bar at which he is working so that he has a better view of his repair work and more space in which to maneuver his hands and tools. Bushing covers 50 may be made from any resilient material, with memory, that may be formed to the desired shape and has the necessary insulative properties. In one manner of practicing the invention, bushing covers 50 may be formed of the same or similar material as that of shield 30.

It will be appreciated that one aspect of the invention is the provision of a complete kit to permit linemen to achieve the full advantages of the invention in which a safety shield 30 and a pair of bushing covers 50 are provided together in kit form.

FIGS. 7-10 illustrate four alternative embodiments of the safety shield with the differences between the embodiments being in the slot structures that facilitate locating and maintaining the safety shield in operative position.

Figure 7:
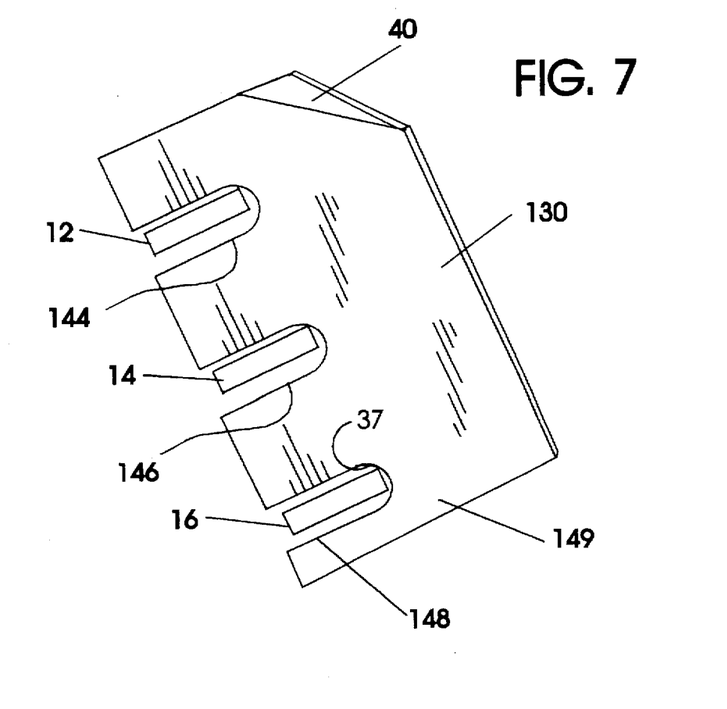
FIGS. 7, 8, 9 and 10 are illustrations of variations of the safety shield.

FIG. 7 shows a safety shield 130 having a slot structure defined by three slots 144, 146, 148. The lowermost slot 148 is a full slot unlike the half slot 48 of the above-described shield 30. It has been found that half slot 48 provides sufficient structure to perform its role in locating and maintaining the position of the shield, with the benefit of reducing the overall height of the shield. However, full slot 148 is an acceptable alternative and has the advantage of providing additional shield area at 149 for use in situations where this additional area is beneficial and does not interfere with insertion of the shield.

Figure 8:
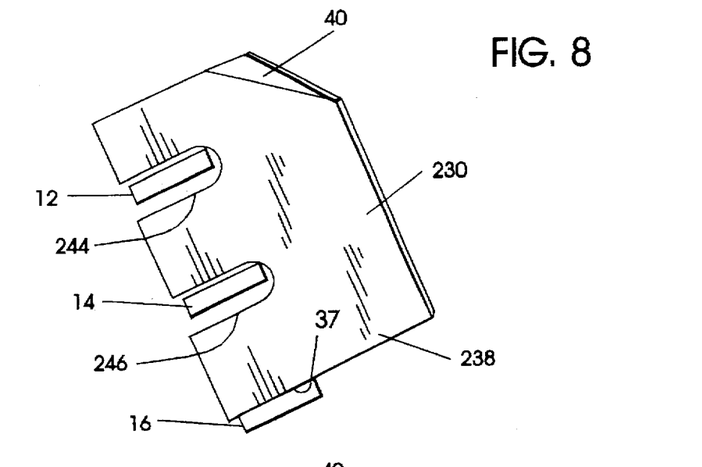

FIG. 8 shows a safety shield 230 having a slot structure in which the lowermost slot has been eliminated. However, shield 230 utilizes a portion of edge 238 as a lower engagement surface 37 to rest upon the top of connector bar 16 when shield 230 is in operative position, thereby helping to maintain the shield in position in conjunction with the upper slots 244, 246.

Figure 9:
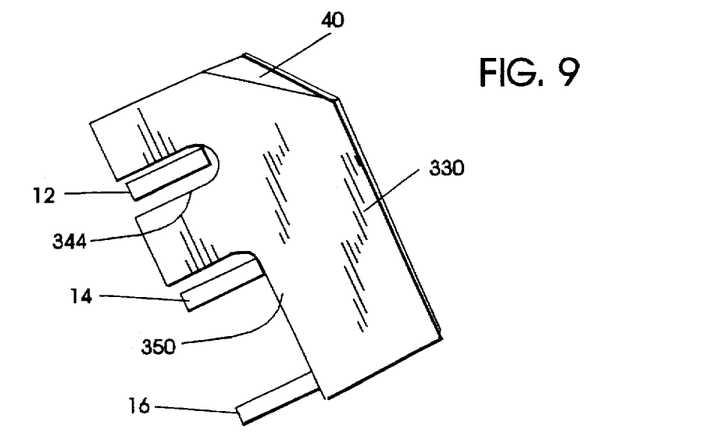

FIG. 9 illustrates another safety shield 330 having a slot structure comprising an upper slot 344 and a lower slot 350 that accommodates the two lower connector bars 14 and 16. The insertion of shield 330 into operative position is similar to the insertion of the above-mentioned shields. When in position, the upper surfaces of connector bars 12, 14 rest against the top edges of slots 344, 350, while the side of connector bar 16 rests against the lower edge of slot 350.

Figure 10:
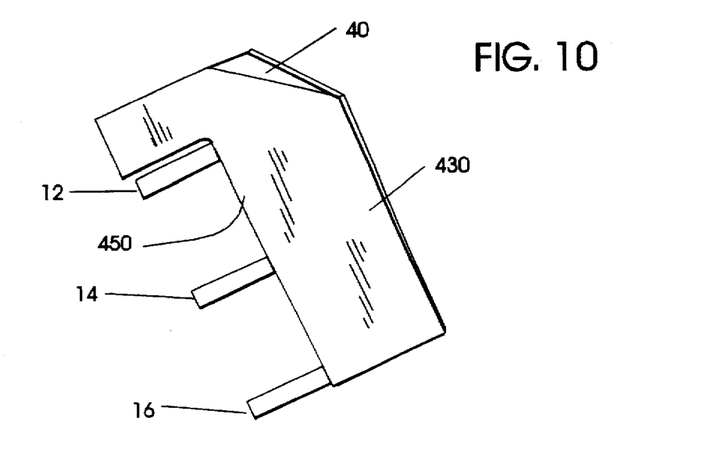

FIG. 10 illustrates yet another safety shield 430 having a slot structure that includes a single slot 450. The upper surface of connector bar 12 rests against the top edge of slot 450 while the sides of connector bars 14 and 16 rest against edge portions of slot 450. Because the connector bars and the safety shields are typically oriented in the angular positions shown in the drawings, the contact areas described in connection with shield 430 are sufficient to maintain the shield in operative position; however, a more positive retention of the shield may be achieved by the slot structures discussed above, particularly those of FIGS. 3, 7 and 8.

Accordingly, the safety concerns associated with a lineman's work on an energized pad-mounted transformer have been addressed by a simple, yet remarkably effective, invention that is specifically tailored for use with the conventional structure found inside these transformers.

While the present invention has been described in connection with certain illustrated embodiments, it will be appreciated that modifications may be made without departing from the true spirit and scope of the invention.

That which is claimed is:

1. In combination, a pad mounted transformer having an access side, a windings side, a vertical transformer face separating the access side from the windings side, three secondary bushings defining an uppermost bushing, a middle bushing and a lowermost bushing located on the access side of the transformer face with the secondary bushings being generally aligned and spaced apart, and a connector bar joined to each of said secondary bushings carrying junctions for wires routed from the bushings to an utility customer, and a safety shield for preventing contact of a worker's tool engaging said junctions with adjacent portions of the transformer face, said safety shield comprising a planar, rigid sheet of dielectric material having a thickness sufficient to provide insulative protection for the voltage levels found at the access side of the pad-mounted transformer, said sheet including an edge and a slot structure opening to said edge, said slot structure including first and second full slots and a third half slot spaced apart by distances corresponding to distances between the uppermost, middle and lowermost bushings, and said slot structure further including an aligned base structure defined by respective base portions of said slots in engaging contact with the uppermost, middle and lowermost bushings, said slots serving to locate and maintain the sheet in operative position with respect to the secondary bushings and associated connector bars, with said sheet covering portions of the transformer face adjacent to the secondary bushings to prevent contact of the worker's tool with the covered portions and resultant arcing and flashing.

2. The combination of claim 1 wherein said first, second and third slots are spaced apart by a distance on the order of 5%16 inches.

3. The safety shield of claim 2 wherein said first and second slots have a width of approximately 1 7/16 inches.

4. The combination of claim 2 wherein said slots have a length of approximately 7 5/8 inches.

5. The combination of claim 1 wherein said shield has a generally rectangular configuration.

6. The combination of claim 5 wherein said sheet has dimensions on the order of 16 inches by 14 inches.

7. The combination of claim 1 wherein the transformer face includes a vertical lip and the area of said safety shield sheet is sufficient to cover portions of said vertical lip.

8. The combination of claim 1 wherein said safety shield includes a raised portion for providing protection against the worker's tool contact with a conventional breaker operating handle located on the transformer face.

9. The combination of claim 8 wherein said raised portion is integrally formed with the remainder of the safety shield and comprises a corner portion thereof located substantially opposed to said edge to which the slot structure opens, with the corner portion being bent at an angle between about 20° to about 90° from the plane of the remainder of the shield.

10. The combination of claim 1 wherein said shield is formed of a PVC acrylic alloy.

11. The combination of claim 10 wherein said PVC acrylic alloy has a dielectric co-efficient on the order of 300 and said thickness being on the order of ⅛ inch.

12. A method for assuring the safety of working personnel performing repairs inside energized pad-mounted transformers of the type having an access side, a windings side, a vertical transformer face separating the access side from the windings side, three secondary bushings defining an uppermost bushing, a middle bushing and a lowermost bushing located on the access side of the transformer face with the secondary bushings being generally aligned and spaced apart, and a connector bar joined to each secondary bushing carrying junctions for wires routed from the bushings, said method as performed by the working personnel comprising the steps of:

accessing the secondary bushings;

identifying the secondary bushing requiring repair;

covering the connector bars of the other two secondary bushings with insulative bushing covers;

covering portions of the transformer face adjacent to the secondary bushings by installing a safety shield to prevent arcing and resultant flashing by contact of workman's tool with the face;

the safety shield taking the form of a planar, rigid sheet of dielectric material having a thickness sufficient to provide insulative protection for voltage levels found at the access side of a pad-mounted transformer, said planar sheet including an edge and a slot structure including an uppermost slot, a middle slot and a lowermost slot opening to said edge, said slot structure including an aligned base structure defined by the respective base portions of said slots for engaging contact with the aligned secondary bushings, the uppermost slot and middle slot being full slots and the lowermost slot being a half slot, the uppermost and middle slots being spaced apart center-to-center by a distance on the order of 5 5/16 inches to correspond to the spacing between the uppermost and middle secondary bushings and the middle slot and lowermost slot being spaced apart by a distance on the order of 5 5/16 inches to correspond to the spacing between the middle and lowermost bushings, and said sheet having a sufficient area to cover portions of the transformer face adjacent to the secondary bushings to prevent arcing and resultant flashing at the covered portions;

the step of installing the safety shield comprising sliding the shield into place in a direction perpendicular to the line of alignment of the three aligned secondary bushings until the aligned base portions of the three slots engage their respective bushings;

conducting a repair operation at the identified secondary bushing;

removing the insulative bushing covers and safety shield; and returning a transformer cover as required to close off access to the bushings.

13. A method for assuring the safety of working personnel performing repairs inside energized pad-mounted transformers of the type having an access side, a windings side, a vertical transformer face separating the access side from the windings side, three secondary bushings defining an uppermost bushing, a middle bushing and a lowermost bushing located on the access side of the transformer face with the secondary bushings being generally aligned and spaced apart, and a connector bar joined to each of said secondary bushings carrying junctions for wires routed from the bushings, said method as performed by the working personnel comprising the steps of:

accessing the secondary bushings;

identifying the secondary bushing requiring repair;

covering the connector bars of the other two secondary bushings with insulative bushing covers;

covering portions of the transformer face adjacent to the secondary bushings by installing a safety shield to prevent arcing and resultant flashing by contact of workman's tool with the face;

the safety shield taking the form of a planar, rigid sheet of dielectric material having a thickness sufficient to provide insulative protection for voltage levels found at the access side of the pad-mounted transformer, said sheet including an edge and a slot structure opening to said edge, said slot structure including first and second full slots and a third half slot spaced apart by distances corresponding to distances between the uppermost, middle and lowermost bushings, and said slot structure further including an aligned base structure defined by respective base portions of said slots in engaging contact with the uppermost, middle and lowermost secondary bushings, said slots serving to locate and maintain the sheet in operative position with respect to the secondary bushings and associated connector bars, with said sheet covering portions of the transformer face adjacent to the secondary bushings to prevent contact of the worker's tool with the covered portions and resultant arcing and flashing at the covered portions;

the step of installing the safety shield comprising sliding the shield into place in a direction perpendicular to the line of alignment of the three aligned secondary bushings until the aligned base portions of the slots engage their respective bushings;

conducting a repair operation at the identified secondary bushing;

removing the insulative bushing covers and safety shield; and returning a transformer cover as required to close off access to the bushings.

* * * * *